Patented July 27, 1926.

1,593,893

UNITED STATES PATENT OFFICE.

RICHARD J. BARRY, OF HOUSTON, TEXAS.

METHOD OF DEHYDRATING CRUDE OIL.

No Drawing.    Application filed December 4, 1925. Serial No. 73,259.

My invention relates to the dehydration of crude petroleum. It involves the separation of the oil from the water emulsified therewith.

In the production of petroleum in deep well operations, the oil as it comes from the well is frequently found emulsified with water in such an intimate mixture that the water will not separate from the oil by gravity. Such oil is commonly called "cut" oil, and when the mixture is particularly homogeneous, it appears to coagulate into what is termed basic sediment. When in this condition the oil cannot be readily separated from the water by present known methods of treatment. Indeed some basic sediment resists all attempts at separation by commercial processes heretofore used. It may stand for years without separating and is commonly considered as an undesirable waste product which cannot be easily disposed of.

My invention has for its object the provision of a process of treatment of crude petroleum, or other oil, emulsified with water so that the water and any other impurities therein may be separated from the oil. It is desired to treat the oil and basic sediment so that the separation by gravity of the foreign matter will take place in a minimum length of time and in a most economical manner. It is adapted for use with all grades of mineral oils and even may be adapted for separation of water from other oils.

In carrying out my invention, very little equipment is needed. The impure or emulsified oil is placed in any convenient container, such as a tank or vat, preferably equipped with steam pipes therein, whereby the oil may be heated when desirable. When the tank has been filled, and the oil thus ready, it first may, or may not, be heated, as desired. I then throw into the mass about 1% or less by weight of salt. The salt I prefer to use is common salt, or sodium chloride, and I have found that any cheap grade or kind of salt may be used.

I next place in the contents of the tank about $\frac{1}{10}$ of 1% by weight of finely pulverized clay or earth, and I have found that clay containing mineral particles, that is a mellow earth easily pulverized, will best act to cause separation of the water and oil. Diatomaceous clay secures most effective results. Fuller's earth, sandy loam, pulverized silicious clay or rock and similar earths all act, in combination with the salt to produce good results. Where the emulsion is not strongly resistant to separation, heat need not be applied, but where old and long-standing basic sediment is treated, heat should be applied until the mass foams (about 204° Fahrenheit). The heat may then be turned off and the oil may next be allowed to stand and then be run off, the oil being found after this treatment entirely free of emulsion. The brine and clay may be again employed in treatment of the next batch of basic sediment.

The process as described is employed without change except that if very little water is present in the oil, a small quantity may be added to assist in the dissolving of the salt. Also the order of adding the salt and clay is not found material and, if desired, they may be added simultaneously. It is also to be noted that, while the small proportions of salt and clay described are entirely effective, the addition of greater amounts will not vary the results. The proportions noted are those found especially effective, but they may be varied without materially changing the manner in which the dehydration is effected. I do not wish therefore to be limited to the exact proportions of the ingredients employed, nor to the use of heat, it being understood that some kinds of emulsion are much more resistant to separation than others. However, the most obstinate mixtures of oil and basic sediment can thus be separated, at a cost that is low compared with other methods, and this is accomplished in a very short period of time. The advantages of the method will be obvious to those skilled in the art.

What I claim as new and desire to protect by Letters Patent is:

1. A method of dehydrating petroleum oil, comprising placing the oil in a container, mixing therewith small proportions of salt and pulverized clay and settling out the water.

2. A method of dehydrating petroleum oil comprising placing the oil in a container, mixing therewith about one per cent by weight of common salt, and about one tenth of one per cent by weight of pulverized clay, settling out the water, and drawing off the oil.

3. A method of separating emulsions of water and oil comprising placing the emulsion in a container, adding thereto small quantities of salt and diatomaceous clay, heating the mixture and drawing off the oil.

4. A method of dehydrating petroleum oil comprising mixing with said oil about one tenth of one per cent of pulverized clay and a small amount of salt, heating the mixture, allowing the separation of the water from the oil, and drawing off the oil.

5. A method of dehydrating oil comprising mixing with said oil comparatively small quantities of pulverized clay and common salt, heating the mass until it foams, allowing the separation of the water and oil by gravity, and then drawing off the oil.

In testimony whereof I hereunto affix my signature December, A. D. 1925.

RICHARD J. BARRY.